(12) United States Patent
Noda et al.

(10) Patent No.: US 8,118,155 B2
(45) Date of Patent: Feb. 21, 2012

(54) PANEL SORTING METHOD AND PANEL SORTING DEVICE

(75) Inventors: Shigekazu Noda, Kanazawa (JP); Masaya Ito, Takaoka (JP)

(73) Assignees: Komatsu Ltd., Tokyo (JP); Oyabe SEIKI Co., Ltd., Oyabe-Shi (JP)

( * ) Notice: Subject to any disclaimer, the term of this patent is extended or adjusted under 35 U.S.C. 154(b) by 380 days.

(21) Appl. No.: 12/225,036

(22) PCT Filed: Mar. 9, 2007

(86) PCT No.: PCT/JP2007/054688
§ 371 (c)(1),
(2), (4) Date: Sep. 12, 2008

(87) PCT Pub. No.: WO2007/119325
PCT Pub. Date: Oct. 25, 2007

(65) Prior Publication Data
US 2009/0200141 A1    Aug. 13, 2009

(30) Foreign Application Priority Data

Mar. 14, 2006   (JP) ................................ 2006-069619

(51) Int. Cl.
*B65G 21/10* (2006.01)

(52) U.S. Cl. ........................................ 198/586; 198/436

(58) Field of Classification Search .................. 198/364, 198/890, 890.1, 369.1, 369.7, 456, 458, 463.1, 198/463.2, 586
See application file for complete search history.

(56) References Cited

U.S. PATENT DOCUMENTS

| | | | | | |
|---|---|---|---|---|---|
| 1,871,832 | A | * | 8/1932 | Absmeier | 198/437 |
| 2,934,195 | A | * | 4/1960 | Bishop et al. | 198/463.2 |
| 4,603,768 | A | * | 8/1986 | Deutschle | 198/369.1 |
| 5,209,339 | A | * | 5/1993 | Antonissen | 198/436 |
| 5,547,084 | A | * | 8/1996 | Okada et al. | 209/583 |

(Continued)

FOREIGN PATENT DOCUMENTS

FR    2593416 A1    7/1987

(Continued)

OTHER PUBLICATIONS

International Preliminary Report on Patentability, Chapter I of the Patent Cooperation Treaty, and Written Opinion dated Sep. 16, 2008 for PCT/JP2007/054688. 4 sheets.

(Continued)

*Primary Examiner* — Gene Crawford
*Assistant Examiner* — William R Harp
(74) *Attorney, Agent, or Firm* — Holtz, Holtz, Goodman & Chick, PC (57) ABSTRACT

In sorting workpieces by using a panel sorting device, a lateral movement amount of a cross shuttle is approximately half of a width W of the workpiece, which is remarkably smaller than that in a conventional device. Therefore, the workpieces can be efficiently transferred to the panel chute in a short cycle time, thereby improving the productivity of a press line. Further, since the workpieces are transferred to two lateral places adjacent to each other on the panel chute and the laterally adjacent workpieces are not unnecessarily separated from each other, the size of the panel chute can be reduced. This, along with the small movement amount of the cross shuttle, enables the whole panel sorting device to be reduced in size and the installation space for the panel sorting device to be also reduced.

2 Claims, 5 Drawing Sheets

U.S. PATENT DOCUMENTS

| | | | |
|---|---|---|---|
| 7,275,635 B2 * | 10/2007 | Enya | 198/572 |
| 7,347,312 B2 * | 3/2008 | Han et al. | 198/346.2 |
| 7,404,478 B2 * | 7/2008 | Weber | 198/457.03 |
| 7,717,251 B2 * | 5/2010 | Glas | 198/448 |
| 2001/0029225 A1 | 10/2001 | Kawamoto et al. | |

FOREIGN PATENT DOCUMENTS

| | | |
|---|---|---|
| JP | 59-101240 A | 6/1984 |
| JP | 63-66015 A | 3/1988 |
| JP | 10-286641 A | 10/1998 |
| JP | 11-005132 A | 1/1999 |
| JP | 2001-1088 A | 1/2001 |
| JP | 2001-1089 A | 1/2001 |
| JP | 2001-276936 A | 10/2001 |
| JP | 2004-002040 A | 1/2004 |

OTHER PUBLICATIONS

Chinese Office Action dated Feb. 5, 2010 and English translation thereof in counterpart Chinese Application No. 2007800177226.

Japanese Office Action dated Jun. 21, 2011 (and English translation thereof) in counterpart Japanese Application No. 2006-069619.

* cited by examiner

PANEL SORTING METHOD AND PANEL SORTING DEVICE

This application is a U.S. National Phase Application under 35 USC 371 of International Application PCT/JP2007/054688 filed Mar. 9, 2007.

TECHNICAL FIELD

The present invention relates to a panel sorting method and a panel sorting device.

BACKGROUND ART

Conventionally, a panel sorting device is provided at a lowermost-stream side in a workpiece conveying direction on a press line using a tandem press or a transfer press. Processed workpieces in the form of a plate are sorted to a plurality of panel chutes to be transferred by such a sorting device. The workpieces that are sorted to the respective panel chutes are loaded to a manual rack device by hand.

As such a panel sorting device, a device that sorts the workpieces to three panel chutes (payoff tables) has been known (for example, see Patent Document 1). The device is provided with a flap conveyor that sorts the workpieces to upper and lower beds at a downstream side of an outlet-side conveyor on a press line (i.e. a downstream side in the workpiece conveying direction). The workpieces that are sorted to the upper bed by the flap conveyor are transferred to a middle panel chute of the three panel chutes that are disposed orthogonal to the workpiece conveying direction.

At the same time, the workpieces that are sorted to the lower bed by the flap conveyor are further sorted to right and left panel chutes of the three panel chutes. Specifically, a laterally reciprocating shuttle conveyor is provided at a downstream side of the flap conveyor. The workpieces are sorted to the right and left panel chutes by moving the shuttle conveyor on which the workpieces are mounted.

[Patent Document 1] JP-A-2001-1088

DISCLOSURE OF THE INVENTION

Problems to be Solved by the Invention

In recent years, there has been a demand for transferring the processed workpieces more efficiently since a stroke per minute has been increased due to performance improvement of a press machine. However, the device disclosed in Patent Document 1 does not sufficiently meet such demand since a movement amount of the reciprocating shuttle conveyor is too large. The device disclosed in Patent Document 1 also requires considerable space for the three panel chutes.

The panel sorting device has put a greater burden on a conveyor belt, a roller around which the conveyor belt is wound and the like since the workpieces have been getting larger in recent years, which has required a frequent maintenance (e.g., a component replacement). Consequently, a lot of time and costs have been required.

An object of the present invention is to provide a panel sorting method that is adaptable to improvement of a press processing productivity and capable of size reduction of a sorting device as a whole.

Another object of the present invention is to provide a panel sorting device that significantly reduces maintenance time and costs.

Means for Solving the Problems

A panel sorting method according to an aspect of the present invention includes: a sorting step for sorting workpieces in the form of a panel in a direction orthogonal to a workpiece conveying direction, the workpieces being conveyed in the workpiece conveying direction; and a transferring step for transferring the sorted workpieces, in which the sorting step includes: a first sorting step for sorting the workpieces that are conveyed in the workpiece conveying direction to one side in the direction orthogonal to the workpiece conveying direction by moving the workpieces for a movement amount that is equal to approximately half of a width of the workpieces; and a second sorting step for sorting the workpieces to the other side in the direction orthogonal to the workpiece conveying direction by moving the workpieces for the movement amount, where a next one of the workpieces is located at a sorting start position simultaneously with transferring one of the workpieces in the transferring step immediately after the first and second sorting steps.

A panel sorting device according to another aspect of the present invention includes: a cross shuttle that sorts workpieces in the form of a panel in a direction orthogonal to a workpiece conveying direction, the workpieces being conveyed in the workpiece conveying direction, the cross shuttle being adapted to move the workpieces that are conveyed in the workpiece conveying direction to one side and the other side in the direction orthogonal to the workpiece conveying direction for a movement amount that is equal to approximately half of a width of the workpiece; and three conveyor belts provided on the cross shuttle in the direction orthogonal to the workpiece conveying direction, the conveyor belts being movable in the workpiece conveying direction, in which when the cross shuttle is positioned on the one side in the direction orthogonal to the workpiece conveying direction, one of the workpieces which is located over a middle conveyor belt and a conveyor belt positioned on the one side in the direction orthogonal to the workpiece conveying direction of the three conveyor belts is transferred and simultaneously next one of workpieces that is conveyed in the workpiece conveying direction is disposed over the middle conveyor belt and a conveyor belt positioned on the other side in the direction orthogonal to the workpiece conveying direction, and when the cross shuttle is positioned on the other side in the direction orthogonal to the workpiece conveying direction, the next one of workpieces which is located over the middle conveyor belt and the conveyor belt positioned on the other side in the direction orthogonal to the workpiece conveying direction of the three conveyor belts is transferred and simultaneously still next one of the workpieces that is conveyed in the workpiece conveying direction is disposed over the middle conveyor belt and the conveyor belt on the one side in the direction orthogonal to the workpiece conveying direction.

In the panel sorting method and the panel sorting device, "the movement amount that is equal to approximately half of the width of the workpiece" means a movement amount slightly larger than half of the width of the workpiece, which is a necessary movement amount for transferring the sorted workpieces without being mutually overlapped.

In this arrangement, the movement amount of the workpiece when being sorted is equal to approximately half of the width of the workpiece, which is remarkably smaller than that in a conventional device. Accordingly, the workpieces can be efficiently sorted and transferred in a short cycle time, thereby improving the productivity of a press line. Further, the size of the panel sorting device as a whole can be reduced and the installation space for the panel sorting device can be also reduced since the movement amount of the workpiece is small.

Furthermore, since the workpiece is always mounted on the middle conveyor belt, the middle conveyor belt becomes quickly worn as compared to the other conveyor belts. However, the severely worn middle conveyor belt can be replaced separately for maintenance since the three conveyor belts are independently provided. Therefore, it is not necessary to replace the other conveyor belts all together, which is preferable in terms of economic efficiency.

BEST MODE FOR CARRYING OUT THE INVENTION

An embodiment of the present invention will be described below with reference to the attached drawings.

Figure 1:
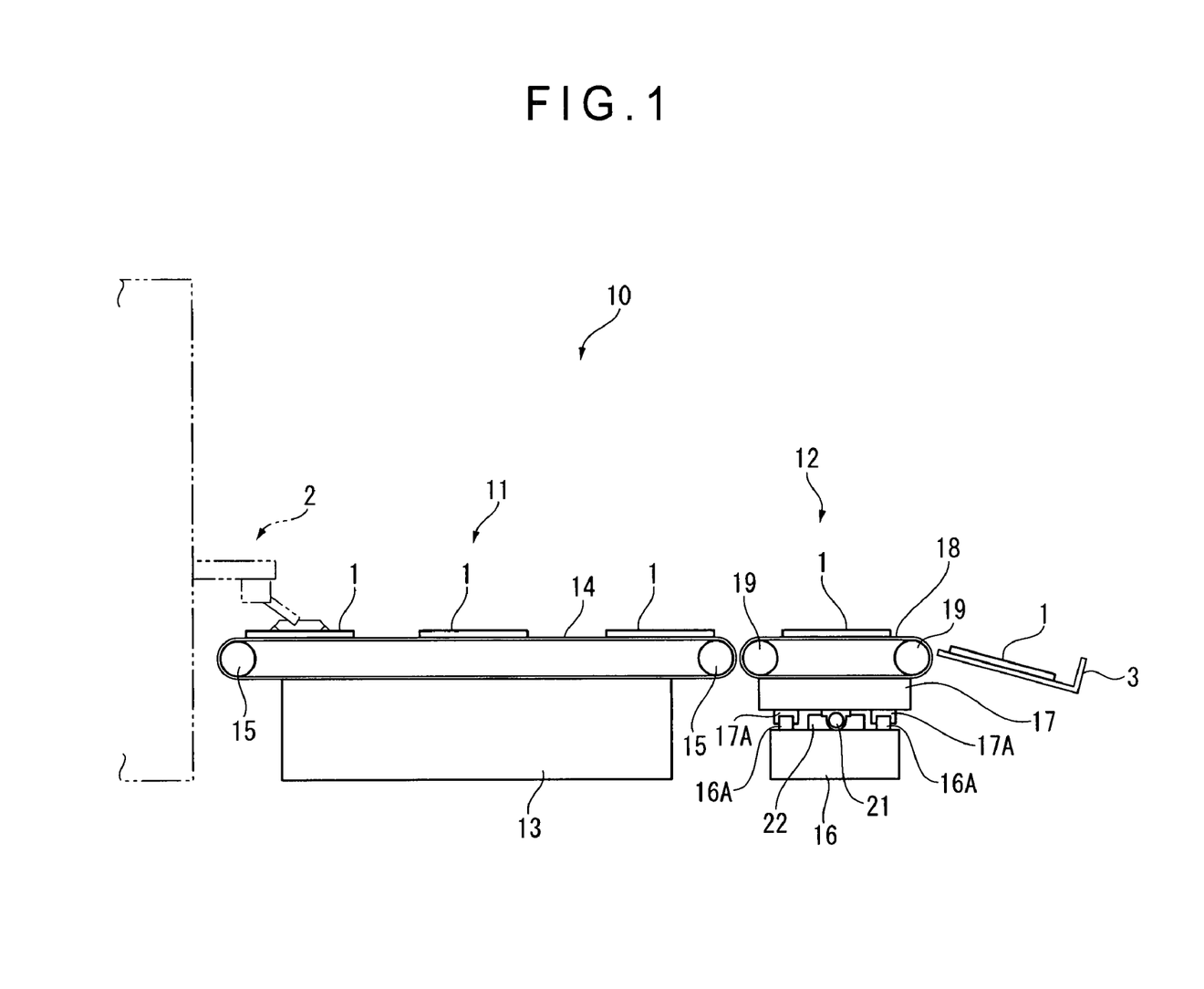
FIG. 1 is a schematic side view showing a panel sorting device according to an embodiment of the present invention.
Figure 2:
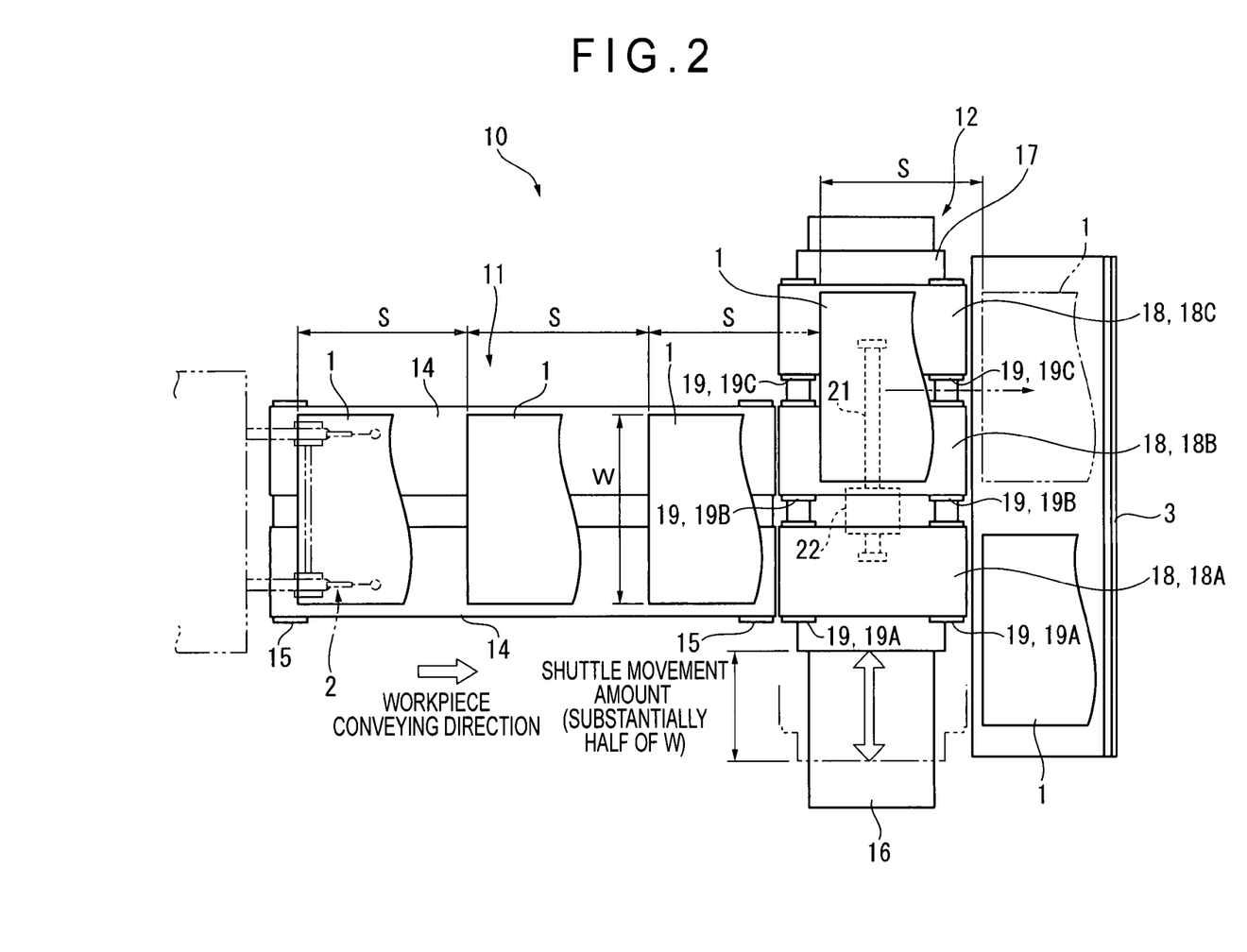
FIG. 2 is a schematic plan view showing the panel sorting device.

FIG. 1 is a schematic side view and FIG. 2 is a schematic plan view respectively showing a panel sorting device 10.

The panel sorting device 10 is provided on a lowermost-stream of a press line using a tandem press or a transfer press to be disposed at a downstream side of an unloading device 2 that transfers workpieces 1 from the press line (i.e. at a downstream side in a workpiece conveying direction) in order to sort the workpieces 1 to two places on a panel chute 3 for transferring the workpieces 1.

Specifically, the panel sorting device 10 includes an outlet-side conveyor 11 on which the workpieces 1 are mounted after being released from the unloading device 2 and a transfer conveyor 12 that sorts the workpieces 1 to the two places on the panel chute 3 for transferring the workpieces 1.

The outlet-side conveyor 11 includes two conveyor belts 14 on a base 13. Front and rear rollers 15 around which the conveyor belts 14 are wound are driven by an electric motor (not shown), whereby the conveyor belts 14 are intermittently moved by a predetermined stroke S so that the workpieces 1 mounted on the conveyor belts 14 are sequentially delivered to the transfer conveyor 12.

The transfer conveyor 12 includes a base 16 and a cross shuttle 17 that is reciprocatable on the base 16 in a direction orthogonal to the workpiece conveying direction in the same plane. A pair of guide rails 16A are provided on an upper surface of the base 16, and a slide part 17A engaged with the guide rails 16A is provided on a lower surface of the cross shuttle 17. The slide part 17A slides on the guide rails 16A so that the cross shuttle 17 is moved relative to the base 16 as a whole. On the cross shuttle 17, three conveyor belts 18 (18A, 18B, 18C) that are driven along the workpiece conveying direction are provided in parallel along a moving direction of the cross shuttle 17.

A width of the respective conveyor belts 18 on the cross shuttle 17 is the same as that of the conveyor belts 14 on the outlet-side conveyor 11. Also, a distance between adjacent conveyor belts 18 is the same as that between adjacent conveyor belts 14. The conveyor belts 18 are respectively wound around front and rear rollers 19 (19A, 19B, 19C). The individual rollers 19A, 19B and 19C are used to convey the workpieces 1 smoothly. When only one roller is used for the device, the roller may be flexed since it has to be long. As a result, the roller cannot smoothly convey the workpieces 1.

The rollers 19A, 19B and 19C are driven in synchronization with the roller 15 on the outlet-side conveyor 11 to move the conveyor belts 18 by the predetermined stroke S. The workpieces 1 on the conveyor belts 18 are transferred to the panel chute 3 due to the movement by the stroke S. The rollers 19A, 19B and 19C may be driven by separate electric motors or one electric motor.

In addition to the above-described slide part 17A, a ball screw 21 that extends along a moving direction is provided on the lower surface of the cross shuttle 17. The ball screw 21 is inserted into a driving unit 22 mounted on the base 16. A nut is provided in the driving unit 22 to be rotated by the electric motor, and the ball screw 21 is engaged with the nut. Accordingly, the ball screw 21 is laterally moved by a forward and reverse rotation of the nut to reciprocate the cross shuttle 17.

A movement amount of the cross shuttle 17 is slightly larger than half of a width W of the workpiece 1 (i.e. approximately half of the width W) and is slightly larger than a width of the conveyor belt 18. Although the conveyor belts 18A and 18B face the respective conveyor belts 14 on the outlet-side conveyor 11 in FIG. 2, the conveyor belts 18B and 18C face the respective conveyor belts 14 when the cross shuttle 17 is moved to a lower side of FIG. 2. Subsequently, when the cross shuttle 17 is moved to an upper side of FIG. 2, the respective conveyor belts 18A, 18B and 18C return to positions as shown in FIG. 2. The cross shuttle 17 repeats the above sequence of movements.

The movement amount of the cross shuttle 17 may be controlled based on a signal from an encoder for an electric motor provided in the driving unit 22, or controlled by switching the electric motor using a limit switch, various type of sensors, a timer or the like. The movement amount of the cross shuttle 17 can be controlled in an arbitrarily-chosen manner when carrying out the present invention. Driving start timing of the respective conveyor belts 14 and 18 and the cross shuttle 17 may be controlled in a commonly-used manner, e.g., using a timer, a sequencer or the like.

Figure 3A:
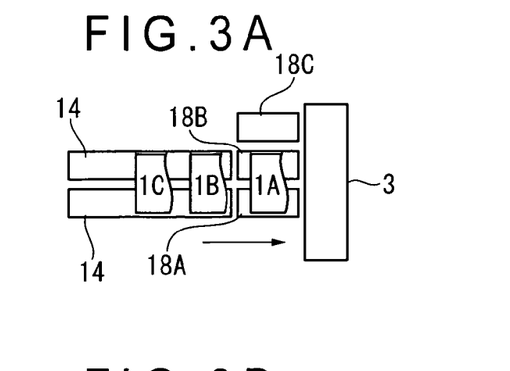
FIG. 3A is a schematic diagram illustrating a movement of the panel sorting device.
Figure 3B:
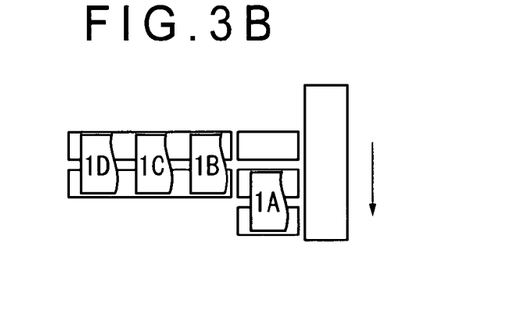
FIG. 3B is another schematic diagram illustrating the movement of the panel sorting device.
Figure 3C:
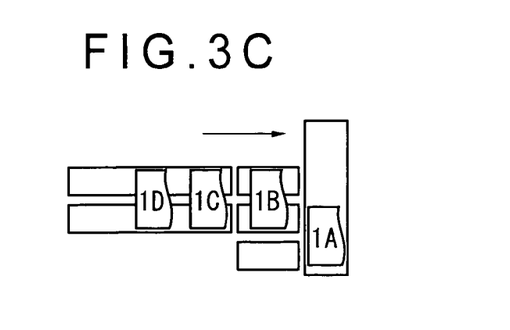
FIG. 3C is still another schematic diagram illustrating the movement of the panel sorting device.
Figure 3D:
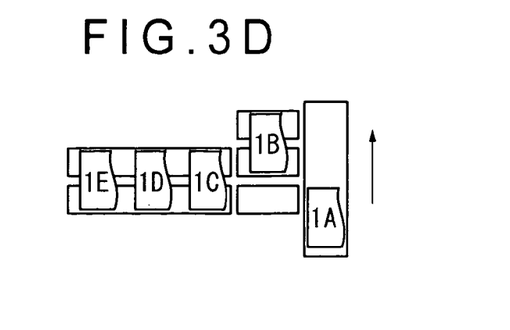
FIG. 3D is further schematic diagram illustrating the movement of the panel sorting device.
Figure 3E:
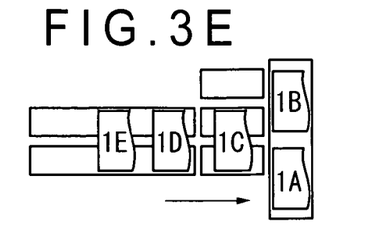
FIG. 3E is still further schematic diagram illustrating the movement of the panel sorting device.
Figure 3F:
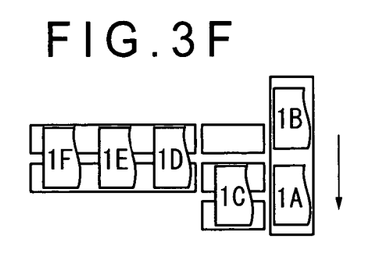
FIG. 3F is still further schematic diagram illustrating the movement of the panel sorting device.
Figure 3G:
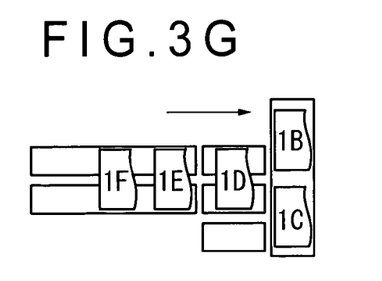
FIG. 3G is still further schematic diagram illustrating the movement of the panel sorting device.
Figure 3H:
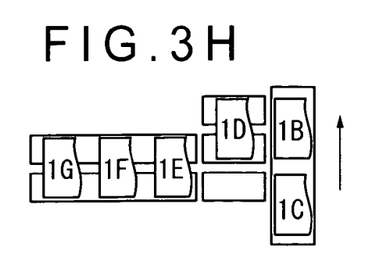
FIG. 3H is still further schematic diagram illustrating the movement of the panel sorting device.
Figure 4:
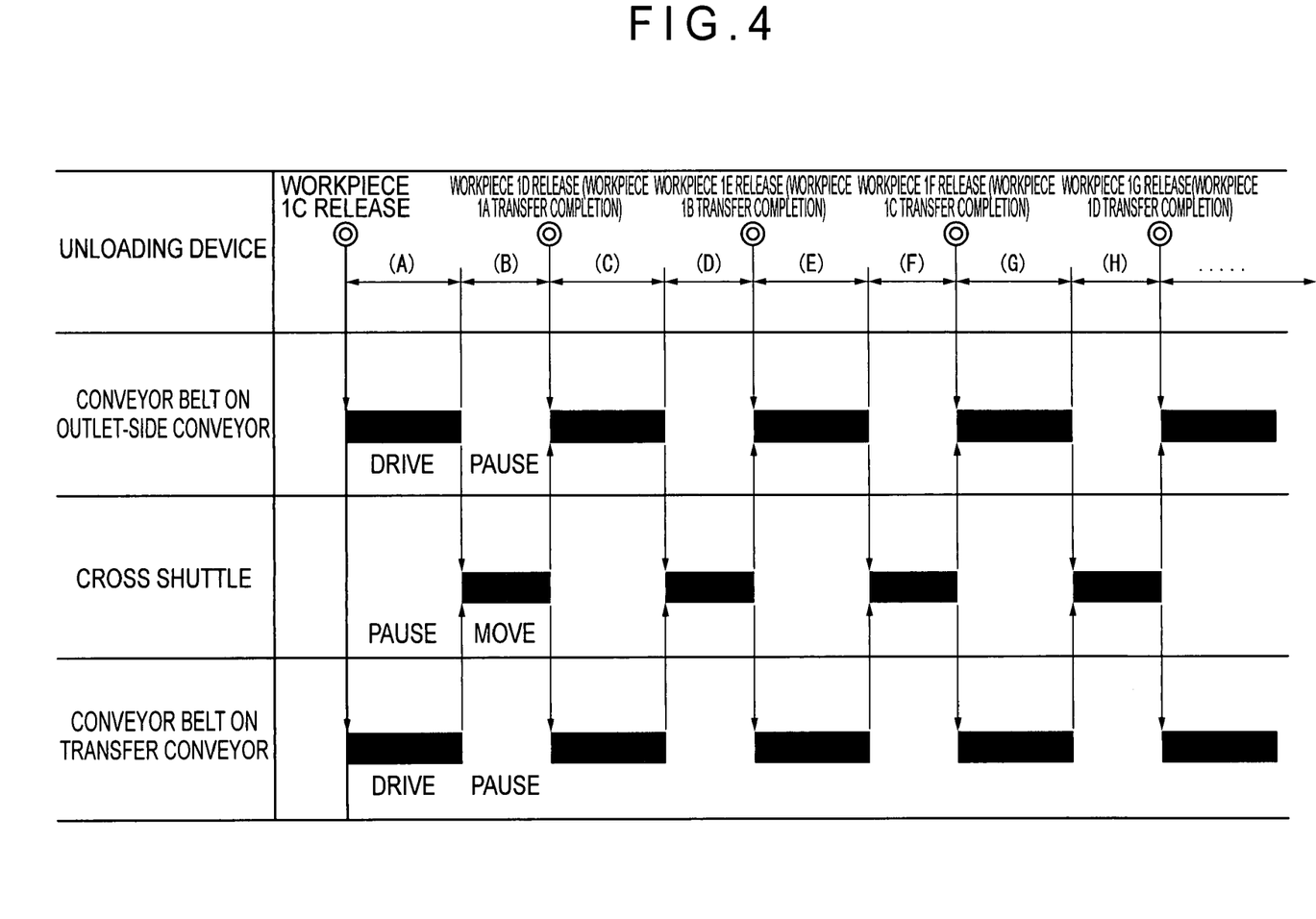
FIG. 4 is a time chart illustrating the movement of the panel sorting device.

FIGS. 3A to 3H illustrate a movement of the panel sorting device 10 and FIG. 4 illustrates the movement thereof as a time chart. How the workpieces 1 are transferred will be described below with reference to these drawings. States shown in FIGS. 3A to 3H respectively correspond to (A) to (H) sections in FIG. 4. Codes for the conveyor belts 14 and 18 and the panel chute 3 are inserted only in FIG. 3A for clearly showing the respective components.

When the conveyor belts 18A and 18B face the conveyor belt 14 as shown in FIG. 3A and (A) section of FIG. 4, a workpiece 1C is already released on the conveyor belt 14 from the unloading device. Accordingly, workpieces 1A to 1C are mounted on the conveyor belt 14 to be conveyed in the same direction. Then, all conveyor belts 14 and 18 are driven so that the workpiece 1A is mounted on the transfer conveyor 12 over the conveyor belts 18A and 18B. The driving of the conveyor belts 14 and 18 is stopped to dispose the workpiece 1B at a lowermost-stream side of the conveyor belt 14.

Next, the cross shuttle is moved to a lower side of FIG. 3B so that the conveyor belts 18B and 18C face the conveyor belt 14 as shown in FIG. 3B and (B) section of FIG. 4 (a first sorting step of sorting step). Then, the workpiece 1D is released on the conveyor belt 14 from the unloading device. Subsequently, all conveyor belts 14 and 18 are driven so that the workpiece 1A is transferred to one side of the panel chute 3 (a transferring step) and simultaneously the workpiece 1B is mounted on the transfer conveyor 12 over the conveyor belts 18B and 18C as shown in FIG. 3C and (C) section of FIG. 4. At this time, the workpiece 1C is positioned at the lowermost-stream of the conveyor belt 14.

Following the above, the cross shuttle is moved to an upper side of FIG. 3D so that the conveyor belts 18A and 18B face the conveyor belt 14 again as shown in FIG. 3D and (D) section of FIG. 4 (a second sorting step of the sorting step). Then, the workpiece 1E is released on the conveyor belt 14 from the unloading device. Subsequently, all conveyor belts 14 and 18 are driven so that the workpiece 1B is transferred to the other side of the panel chute 3 (the transferring step) and simultaneously the workpiece 1C is mounted on the transfer conveyor 12 over the conveyor belts 18A and 18B as shown in FIG. 3E and (E) section of FIG. 4. At this time, the workpiece 1D is positioned at the lowermost-stream of the conveyor belt 14.

Further, the cross shuttle is moved to a lower side of FIG. 3F so that the conveyor belts 18B and 18C face the conveyor belt 14 again as shown in FIG. 3F and (F) section of FIG. 4 (the first sorting step of the sorting step). Then, the workpiece 1F is released on the conveyor belt 14 from the unloading device. Subsequently, all conveyor belts 14 and 18 are driven so that the workpiece 1C is transferred to the one side of the panel chute 3 (the transferring step) and simultaneously the workpiece 1D is mounted on the transfer conveyor 12 over the conveyor belts 18B and 18C to be located a sorting start position as shown in FIG. 3G and (G) section of FIG. 4. At this time, the workpiece 1E is positioned at the lowermost-stream of the conveyor belt 14.

Next, the same movement as that shown in FIG. 3D and (D) section of FIG. 4 is performed in FIG. 3H and (H) section of FIG. 4. The above-described sequence of movements are repeated to transfer the workpieces 1E, 1G, . . . to the one side of the panel chute 3 and the workpieces 1D, 1F, . . . to the other side of the panel chute 3 in series. The transferred workpieces 1A, 1B, . . . are sequentially further transferred to a pallet (not shown) from the panel chute 3 by pairs of workers.

As described above, in the panel sorting device 10 according to the exemplary embodiment, the movement amount of the cross shuttle 17 is approximately half of the width W of the workpiece 1, which is remarkably smaller than that in a conventional device. Therefore, the workpieces 1 can be efficiently transferred to the panel chute 3 in a short cycle time, thereby improving the productivity of the press line. Further, since the workpieces 1 are transferred to the two lateral places adjacent to each other on the panel chute 3 and the laterally adjacent workpieces 1 are not unnecessarily separated from each other, the size of the panel chute 3 can be reduced. This, along with the small movement amount of the cross shuttle 17, enables the whole panel sorting device 10 to be further reduced in size and the installation space for the panel sorting device 10 to be reduced.

In the panel sorting device 10, the workpieces 1 are always mounted on the conveyor belt 18B on the transfer conveyor 12. Therefore, the conveyor belt 18B and the roller 19B around which the conveyor belt 18B is wound become quickly worn, thereby requiring a frequent maintenance (e.g., a replacement) as compared to the conveyor belts 18A and 18C and the rollers 19A and 19C. However, in the exemplary embodiment, the conveyors 18A, 18B and 18C and the rollers 19A, 19B and 19C are independent from each other so that the severely worn conveyor belt 18B and roller 19B can be separately replaced. Consequently, it is not necessary to replace the other conveyor belts 18A and 18C and rollers 19A and 19C all together, which is preferable in terms of economic efficiency.

The independent arrangement of the rollers 19A, 19B and 19C of the transfer conveyor 12 allows short and hard-to-be-flexed construction of the rollers. Accordingly, rotation variations of the rollers 19A, 19B and 19C are reduced and the conveyor belts 18A, 18B and 18C that are wound around the rollers are smoothly moved, which enables the workpieces 1 to be securely transferred.

The present invention is not limited to the exemplary embodiment described above, but includes other arrangements as long as an object of the present invention can be achieved, which includes the following modifications.

For example, although the outlet-side conveyor 11 includes the two conveyor belts 14 in the exemplary embodiment, only one wide conveyor belt may be used. One wide conveyor belt may be also used instead of the three conveyor belts 18A, 18B and 18C on the transfer conveyor 12 in the panel sorting method according to the present invention. However, it is preferable that the separate conveyor belts 18A, 18B and 18C are used since the above-described advantages are attained by using the separate conveyor belts 18A, 18B and 18C.

Although the panel sorting device 10 according to the present invention includes the outlet-side conveyor 11, the outlet-side conveyor 11 may be included.

Although the best arrangement and method for carrying out the present invention have been disclosed above, the present invention is not limited thereto. In other words, while the present invention has been described with reference to the specific embodiment and the drawings thereof, various modifications may be made to the disclosed embodiment by those of ordinary skill in the art without departing from the spirit and scope of the invention.

Accordingly, the above-disclosed shape, quantity and the like are merely described as examples for easy understanding of the present invention, so that the present invention is not limited thereto. The present invention shall include a description with names of components excluding a part or all of the limitation on the shape and quantity, etc.

The invention claimed is:

1. A panel sorting method for a panel sorting apparatus which sorts and transfers workpieces in the form of a panel, the panel sorting apparatus comprising (i) a transfer conveyor disposed at a downstream side of a conveying direction of workpieces in a form of a panel relative to a press machine, wherein the transfer conveyor receives the workpieces transferred from the press machine and transfers the workpieces in the workpiece conveying direction, and (ii) a cross shuttle adapted to move to a first side in a direction orthogonal to the workpiece conveying direction and to a second side in the direction orthogonal to the workpiece conveying direction, the cross shuttle comprising a middle conveyor belt, a first side conveyor belt positioned on the first side in the direction orthogonal to the workpiece conveying direction relative to the middle conveyor belt, and a second side conveyor belt positioned on the second side in the direction orthogonal to the workpiece conveying direction relative to the middle conveyor belt, each of the middle conveyor belt, the first side conveyor belt, and the second side conveyor belt having a width approximately half of a width of the workpieces, wherein a sum of the width of the middle conveyor belt and the width of the first side conveyor belt is approximately equal to a width of a transfer conveyor belt of the transfer conveyor, and wherein a sum of the width of the middle conveyor belt and the width of the second side conveyor belt is approximately equal to the width of the transfer conveyor belt, the panel sorting method comprising:

sorting the workpieces in the direction orthogonal to the workpiece conveying direction, the workpieces being conveyed in the workpiece conveying direction; and     transferring the sorted workpieces;

wherein the sorting includes:

first sorting the workpieces that are conveyed in the workpiece conveying direction to the first side in the direction orthogonal to the workpiece conveying direction by moving the workpieces by a movement amount that is equal to approximately half of the width of the workpieces; and         second sorting the workpieces to the second side in the direction orthogonal to the workpiece conveying direction by moving the workpieces by the movement amount,         wherein:

in the first sorting, the workpiece is mounted over the middle conveyor belt and the first side conveyor belt and is moved to the first side in the direction orthogonal to the workpiece conveying direction by the movement amount,         in the second sorting, the workpiece is mounted over the middle conveyor belt and the second side conveyor belt and is moved to the second side in the direction orthogonal to the workpiece conveying direction by the movement amount,         immediately after the first sorting, simultaneously with the transferring of the workpiece, a next one of the workpieces is located over the middle conveyor belt and the second side conveyor belt, and         immediately after the second sorting, simultaneously with the transferring of the workpiece, a next one of the workpieces is located over the middle conveyor belt and the first side conveyor belt.

2. A panel sorting device comprising:

a transfer conveyor disposed at a downstream side of a conveying direction of workpieces in the form of a panel relative to a press machine, the transfer conveyor receiving the workpieces transferred from the press machine and transferring the workpieces in the conveying direction;

a cross shuttle that sorts the workpieces in a direction orthogonal to the workpiece conveying direction, the workpieces being conveyed from the transfer conveyor, the cross shuttle being adapted to move the workpieces that are conveyed from the transfer conveyor to a first side and a second side in the direction orthogonal to the workpiece conveying direction; and     three conveyor belts provided on the cross shuttle in the direction orthogonal to the workpiece conveying direction, the conveyor belts being movable in the workpiece conveying direction, the three conveyor belts comprising a middle conveyor belt that faces the transfer conveyor, a first side conveyor belt that is positioned on the first side in the direction orthogonal to the workpiece conveying direction relative to the middle conveyor belt, and a second side conveyor belt that is positioned on the second side in the direction orthogonal to the workpiece conveying direction relative to the middle conveyor belt,     wherein a sum of a width of the middle conveyor belt and a width of the first side conveyor belt is approximately equal to a width of a transfer conveyor belt of the transfer conveyor,     wherein a sum of the width of the middle conveyor belt and a width of the second side conveyor belt is approximately equal to the width of the transfer conveyor belt,     wherein when the cross shuttle is positioned on the first side in the direction orthogonal to the workpiece direction, one of the workpieces which is located over the middle conveyor belt and the first side conveyor belt is transferred from the cross shuttle and simultaneously a next one of the workpieces that is conveyed from the transfer conveyor is disposed over the middle conveyor belt and the second side conveyor belt, and     wherein when the cross shuttle is positioned on the second side in the direction orthogonal to the workpiece conveying direction, the next one of workpieces which is located over the middle conveyor belt and the second side conveyor belt is transferred from the cross shuttle and simultaneously a still next one of the workpieces that is conveyed in the workpiece conveying direction is disposed over the middle conveyor belt and the first side conveyor belt.

* * * * *